United States Patent [19]
Orimoto

[11] Patent Number: 5,992,868
[45] Date of Patent: Nov. 30, 1999

[54] WHEEL SUSPENSION SYSTEM HAVING A HIGH RIGIDITY TO SIDE FORCES

[75] Inventor: Yukihiro Orimoto, Wako, Japan

[73] Assignee: Honda Giken Kogyo Kabushiki Kaisha, Tokyo, Japan

[21] Appl. No.: 08/954,202

[22] Filed: Oct. 20, 1997

[30] Foreign Application Priority Data

Nov. 26, 1996 [JP] Japan .................................. 8-314432

[51] Int. Cl.$^6$ ...................................................... B60G 3/20
[52] U.S. Cl. ............................ 280/124.138; 280/124.143
[58] Field of Search ..................... 280/124.135, 124.136, 280/124.138, 124.139, 124.141, 124.142, 124.143

[56] References Cited

U.S. PATENT DOCUMENTS

| | | | |
|---|---|---|---|
| 2,173,667 | 9/1939 | Slack ................................ | 280/124.138 |
| 4,457,537 | 7/1984 | Von Der Ohe et al. ......... | 280/124.138 |
| 4,462,609 | 7/1984 | Von Der Ohe .................. | 280/124.135 |
| 4,938,498 | 7/1990 | Sears ................................ | 280/124.138 |
| 5,380,024 | 1/1995 | Hayami ............................ | 280/124.138 |

*Primary Examiner*—Peter C. English
*Attorney, Agent, or Firm*—Armstrong, Westerman, Hattori, McLeland and Naughton

[57] ABSTRACT

In a double wishbone type wheel suspension system comprising an upper A-arm and a lower A-arm, a toe control link is additionally provided between the vehicle body and a forward part of the knuckle. In particular, the pivotal attachment of the toe control link to the vehicle body is located below the plane defined by the lower A-arm, and the toe control link is located generally ahead of the spindle of the wheel. Therefore, the toe control link can be arranged close to the road contact surface of the wheel so that the resistance of the wheel against the side force which tends to tilt the wheel in the direction to change the camber angle can be increased so that a high camber rigidity can be achieved. This improves the anti-squat property of the vehicle, and improves the lateral stability of the vehicle when traveling over irregular road surfaces as well as when making turns. Also, because the toe control ink is placed ahead of the spindle, it is possible to maximize the distance between the control link and the king pin axis, which typically has a negative caster angle and a negative caster trail. Therefore, a highly controllable toe compliance can be produced so that a suitable side-force steer-in property can be achieved while maintaining a sufficient camber rigidity.

4 Claims, 1 Drawing Sheet

WHEEL SUSPENSION SYSTEM HAVING A HIGH RIGIDITY TO SIDE FORCES

TECHNICAL FIELD

The present invention relates to a double-wishbone type wheel suspension system, and in particular to a wheel suspension system demonstrating a high rigidity to side forces. This invention is applicable to both front and rear wheels, but is particularly suitable for rear wheel suspension systems.

BACKGROUND OF THE INVENTION

When a suitable amount of toe angle is given to the outer rear wheel of a vehicle making a turn so as to tilt the outer rear wheel inwardly with respect to the turning circle of the vehicle, because the slip angle required for the outer rear wheel can be achieved while involving a relatively small vehicle body slip angle, a relatively brisk rise in the cornering force can be achieved as the front wheels are steered. This is desirable as it improves the handling of the vehicle. In particular, it is beneficial to cause the toe angle of the outer rear wheel, which supports a larger part of the vertical load, to change so as to turn inward with respect to the turning circle when subjected to a side force.

To achieve such a tendency, which is called as a side-force steer-in property, a suitable amount of toe compliance is required for each rear wheel suspension system. On the other hand, for the vehicle to be able to recover itself briskly from a turning maneuver and to improve the stability of the vehicle when traveling straight ahead, each wheel suspension system is required to have a high camber rigidity. Therefore, the rear wheel suspension system is required to have two conflicting properties, rigidity and compliance. From a practical view point, it is desirable for the rear wheel suspension system to have as high a rigidity as possible to allow a desired handling of the vehicle to be achieved.

BRIEF SUMMARY OF THE INVENTION

In view of such problems of the prior art, a primary object of the present invention is to provide a rear wheel suspension system which demonstrates a high rigidity against side forces.

A second object of the present invention is to provide a rear wheel suspension system which can provide a suitable amount of toe compliance without compromising the camber rigidity thereof against side forces.

A third object of the present invention is to provide a rear wheel suspension system which demonstrates other favorable properties desired for a normal suspension system without sacrificing the rigidity thereof against side forces.

A fourth object of the present invention is to provide a rear wheel suspension system which is simple in structure and can provide generally desirable properties as a rear wheel suspension system.

According to the present invention, these and other objects of the present invention can be accomplished by providing a wheel suspension system, comprising: a knuckle rotatably carrying a wheel; an upper arm having a base end pivotally attached to a part of a vehicle body so as to be pivotable around a first axial line, and a free end pivotally attached to an upper part of the knuckle; a lower arm assembly having a base end pivotally attached to another part of the vehicle body so as to be pivotable around a second axial line, and a free end pivotally attached to a lower part of the knuckle; and a toe control link having a base end pivotally attached to yet another part of the vehicle body, and a free end pivotally attached to a relatively forward part of the knuckle; wherein the base end of the toe control link pivotally attached to the vehicle body is located below a surface defined by the second axial line and the free end of the lower arm pivotally attached to the knuckle. Preferably, the free end of the toe control link pivotally attached to the knuckle is also located below the surface defined by the second axial line and the free end of the lower arm pivotally attached to the knuckle.

Thus, the toe control link can be arranged close to the road contact surface of the wheel so that the resistance of the wheel against the side force which tends to tilt the wheel in the direction to change the camber angle can be increased, and, therefore, a high camber rigidity can be achieved. This improves the anti-squat property of the vehicle, and improves the lateral stability of the vehicle when traveling over irregular road surfaces as well as when making turns.

Preferably, the toe control link is generally located ahead of a central axial line of the wheel so that it is possible to maximize the distance between the control link and the king pin axis, which typically has a negative caster angle and a negative caster trail. Therefore, a suitable toe compliance can be achieved so that a highly controlled side-force steer-in can be achieved while maintaining a sufficient toe rigidity.

This wheel suspension system can be applied to both front and rear wheel suspension systems, but is particularly suited for a rear wheel suspension system. Also, the present invention can be applied to various forms of wheel suspension systems, but is particularly suited for double wishbone suspension systems using upper and lower A-arms.

According to a preferred embodiment of the present invention, the second axial line is tilted with its forward end up. Thus, the instantaneous center of rotation of the wheel undergoing a vertical motion can be placed above and ahead of the spindle at a desired point so that it is possible to achieve an anti-lift action as desired when a brake is applied to the vehicle. Also, it is possible to give the suspension geometry a suitable mechanical compliance which allows the spindle to move rearward as the wheel moves upward. Therefore, when the wheel rides over a projection on the road surface, the road surface contact point of the wheel moves rearward. It means that the impact of riding over the projection is reduced, and the ride comfort of the vehicle can be improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
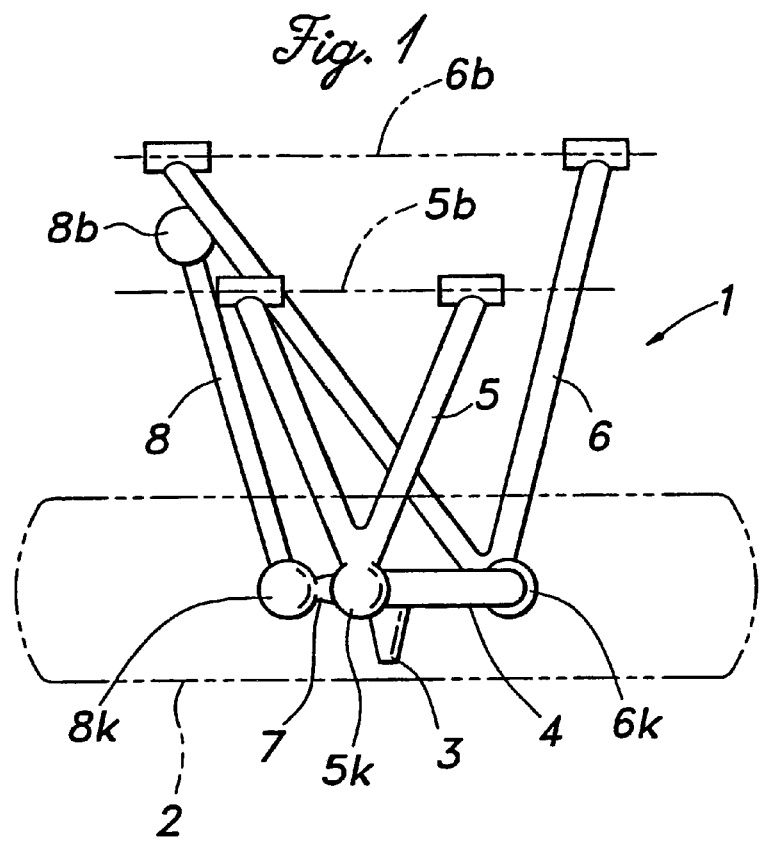
FIG. 1 is a simplified plan view of a rear wheel suspension system embodying the present invention.
Figure 2:
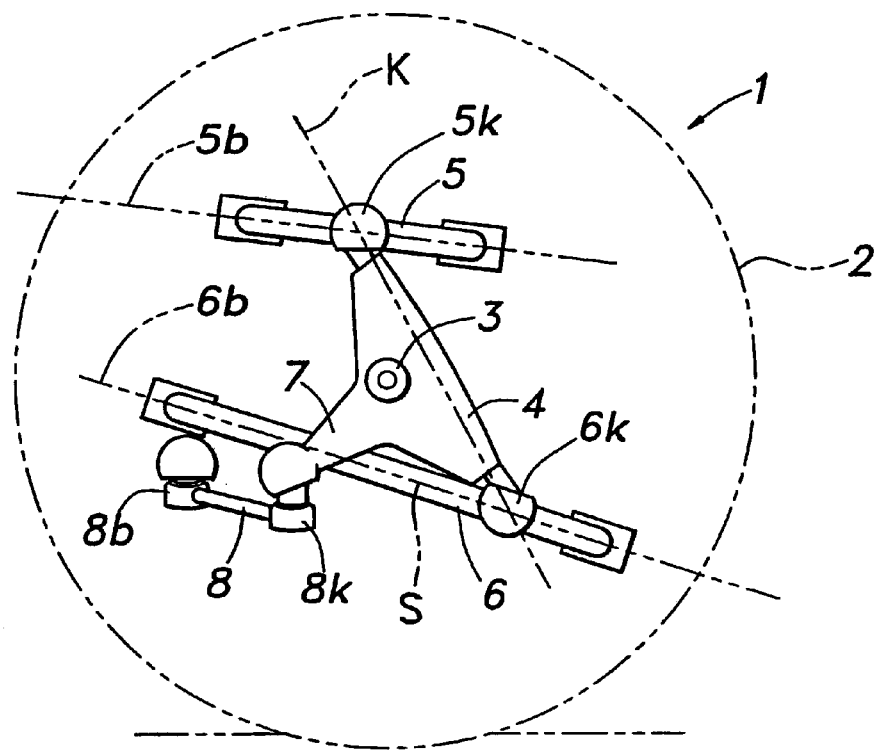
FIG. 2 is a simplified side view of the rear wheel suspension system of FIG. 1.

FIGS. 1 and 2 show a rear wheel suspension system embodying the present invention. This rear wheel suspension system 1 is constructed as a double wishbone type suspension system, and comprises a knuckle 4 having a spindle 3 for rotatably supporting a wheel 2 projecting therefrom, an upper A-arm 5 extending between an upper part of the knuckle 4 and a part of the vehicle body, and a lower A-arm 6 extending between a lower part of the knuckle 4 and a different part of the vehicle body. The base ends of the upper and lower A-arms 5 and 6 are pivotally supported by the vehicle body around pivot axial lines 5b and 6b, respectively. The pivot axial line 5b of the upper A-arm 5 is somewhat tilted with its forward end up, and the pivot axial line 6b of the lower A-arm 6 is slightly even more tilted with its forward end up. The free ends 5k and 6k of the upper and lower A-arms 5 and 6 are pivotally attached to the corresponding parts of the knuckle 4 via ball and socket joints, respectively.

A virtual kingpin axis K for this suspension system is defined by a line extending between the points at which the A-arms 5 and 6 are pivotally attached to the knuckle 4 via the ball and socket joints. As illustrated in FIG. 2, the kingpin axis K is tilted forward so as to define a negative caster angle, and a negative caster trail.

A toe control link 8 extends between a forward extension 7 of the knuckle 4 and yet another part of the vehicle body. The two pivoted ends 8b and 8k of the toe control link 8 are located below a plane S defined by the lower A-arm 6, and forward of the center of the spindle 3. The plane S is defined so as to include the axial line 6b of the pivot shaft pivotally supporting the base end of the lower A-arm 6 and the center point of the ball and socket joint formed between the free end 6k of the lower A-arm 6 and the knuckle 4.

Only one of the two rear wheel suspension systems was described above because the two rear wheel suspension systems are symmetric to each other, and are otherwise identical to each other in structure.

Because the point 8b of pivotal attachment of the toe control link 8 to the vehicle body is lower than the surface S defined by the lower A-arm 6, the toe control link 8 can be arranged close to the road contact surface of the wheel 2. Therefore, the resistance of the wheel against the side force which tends to tilt the wheel in the direction to change the camber angle can be increased so that a high camber rigidity can be achieved. This improves the anti-squat property of the vehicle, and improves the lateral stability of the vehicle when traveling over irregular road surfaces as well as when making turns.

Because the toe control link 8 is placed ahead of the spindle 3, it is possible to maximize the distance between the control link 8 and the king pin axis K, which has a negative caster angle and a negative caster trail in this case. Therefore, a suitable toe compliance can be achieved so that a highly controlled side-force steer-in property can be achieved while maintaining a sufficient camber rigidity.

It is known that the attitude of the vehicle body when braking and accelerating can be controlled by appropriately arranging the suspension geometry. More specifically, it is desirable to place the instantaneous center of rotation of the wheel undergoing a vertical motion to be above and ahead of the spindle 3 or the center of rotation of the wheel in view of avoiding the lifting of the rear part of the vehicle when a brake is applied to the vehicle or producing an anti-lift action. According to the above described embodiment, because the front-up tilting angles of the pivot shafts supporting the base ends of the A-arms can be selected at will, it is possible to determine the instantaneous center of rotation of the vertical movement of the wheel so as to achieve an anti-lift action as desired.

Additionally, by giving a front-up tilting angle to the pivot shaft supporting the base end of the lower A-arm 6, the suspension geometry can be provided with a mechanical compliance which allows the spindle 3 to move rearward as the wheel 2 moves upward. Therefore, when the wheel 2 rides over a projection on the road surface, the road surface contact point of the wheel moves rearward. It means that the impact of riding over the projection is reduced, and the ride comfort of the vehicle can be improved.

In the above described embodiment, the two ends of the toe control link 8 were both located below the surface defined by the lower A-arm 6. However, the advantage of the present invention can be obtained only if at least the end of the toe control link pivotally attached to the vehicle body is below the surface S defined by the lower A-arm 6, and the end of the toe control link pivotally attached to the knuckle 4 may be on the same level as or somewhat higher than the surface S.

In the above described embodiment, both the upper and lower arms 5 and 6 consisted of A-arms, but the present invention can be also applied to suspension systems using I-arm and multi-link arrangements. In the case of a multi-link suspension, the plane S may be approximately defined as a plane determined by the two lateral links and the pivotal points of attachment to the vehicle body and the knuckle.

Thus, according to the present invention, the side force applied to the tire at the point of contact with the road surface can be supported by both the lower arm and the toe control link, and, additionally, the end of the toe control link pivotally attached to the vehicle body can be brought closer to the contact point of the tire with the road surface than was hitherto possible so that the resistance of the tire against the side force which tends to increase the camber angle of the tire can be increased or, in other words, the camber rigidity of the wheel can be improved. Also, by placing the toe control link ahead of the wheel spindle or the axle, it is possible to increase the distance between the toe control link and the kingpin axis which may be provided with a negative caster angle and a negative caster trail. This provides a suitable toe compliance which allows a suitable amount of side-force steer-in property without impairing the camber rigidity.

Although the present invention has been described in terms of a preferred embodiment thereof, it is obvious to a person skilled in the art that various alterations and modifications are possible without departing from the scope of the present invention which is set forth in the appended claims.

What I claim is:

1. A wheel suspension system, comprising:
   a knuckle rotatably carrying a wheel;
   an upper arm having a base end pivotally attached to a part of a vehicle body so as to be pivotable around a first axial line, and a first free end pivotally attached to an upper part of said knuckle;
   a lower arm having a base end pivotally attached to another part of the vehicle body so as to be pivotable around a second axial line, and a second free end pivotally attached to a lower part of said knuckle; and
   a toe control link having a base end pivotally attached to yet another part of the vehicle body, and a third free end pivotally attached to a relatively forward part of the knuckle, said third free end located be low a surface defined by said second axial line and said second free end;
   wherein said base end of said toe control link pivotally attached to said vehicle body is located below said surface, and
   wherein said second axial line is tilted with a forward end up.

2. A wheel suspension system according to claim 1, wherein said toe control link is generally located ahead of a central axial line of said wheel.

3. A wheel suspension system according to claim 1, wherein said wheel suspension system consists of a rear wheel suspension system.

4. A wheel suspension system according to claim 1, wherein said upper and lower arms each consist of an A-arm.

* * * * *